United States Patent
Typaldos

[11] Patent Number: 6,105,081
[45] Date of Patent: Aug. 15, 2000

[54] UART CHARACTER MATCHING USED FOR ADDRESS MATCHING ON A REGISTER-BY-REGISTER BASIS

[75] Inventor: Melanie D. Typaldos, Buda, Tex.

[73] Assignee: Advanced Micro Devices, Inc., Sunnyvale, Calif.

[21] Appl. No.: 09/088,610

[22] Filed: Jun. 1, 1998

[51] Int. Cl.⁷ .............................. G06F 13/12; G06F 13/20
[52] U.S. Cl. .................... 710/26; 710/8; 710/9; 710/260; 710/266; 711/1; 711/105; 711/202; 714/819
[58] Field of Search .................. 710/8, 9, 26, 260, 710/266; 340/146.2; 711/1, 105, 202; 714/819

[56] References Cited

U.S. PATENT DOCUMENTS

| | | | |
|---|---|---|---|
| 4,450,520 | 5/1984 | Hollaar et al. | 364/200 |
| 4,857,882 | 8/1989 | Wagner et al. | 340/146.2 |
| 5,166,660 | 11/1992 | Peterson et al. | 340/146.2 |
| 5,630,163 | 5/1997 | Fung et al. | 395/800 |
| 5,953,738 | 9/1999 | Rao | 711/105 |
| 6,000,013 | 12/1999 | Lau et al. | 711/119 |
| 6,018,786 | 1/2000 | Krick et al. | 711/4 |
| 6,041,422 | 3/2000 | Deas | 714/8 |

OTHER PUBLICATIONS

*Using the Am186™ES and Am188™ES Microcontrollers in Communications Applications*, Advanced Micro Devices, Inc., Apr. 2, 1997.

*AM186™EM and Am188™EM Microcontrollers User's Manual*, Advanced Micro Devices Inc., pp. i through viii, 9–1 through 9–13, and 11–1 through 11–8.

*Primary Examiner*—Thomas C. Lee
*Assistant Examiner*—Thuan Du
*Attorney, Agent, or Firm*—Akin, Gump, Strauss, Hauer & Feld, LLP

[57] ABSTRACT

An asynchronous serial port is provided in a microcontroller that includes an address matching function that includes character matching functions such that incoming data is compared to match registers for special framing characters. Further, however, address bits are provided within the serial data, and additional matching bits are provided for matching those address bits along with the character data within the matching registers. In this way, not only is framing data detected by the detection of special characters, but a microcontroller can determine when it is being addressed in a multidrop, address bit protocol system by matching the address bit and address data.

15 Claims, 8 Drawing Sheets

UART CHARACTER MATCHING USED FOR ADDRESS MATCHING ON A REGISTER-BY-REGISTER BASIS

BACKGROUND OF THE INVENTION

1. Field of the Invention

The invention relates to microcontrollers, and more specifically, to a microcontroller having an improved asynchronous serial interface.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may support a wide range of communication applications.

Microcontrollers have been used for many years in many applications. A number of these applications involve communications over electronic networks, such as telephone lines, computer networks, and local and wide area networks, in both digital and analog formats. In communications applications, a microcontroller generally has a number of integrated communications peripherals in addition to the execution unit. These can be low and high speed serial ports, as well as more sophisticated communications peripherals, such as a universal serial bus (USB) interface, and high level data link control (HDLC) channels.

An asynchronous serial communications port is one such common additional feature in a microcontroller. An asynchronous serial link allows the microcontroller to communicate with other devices or over data lines by sequentially sending and receiving bits of data. The "asynchronous" nature indicates these ports do not provide a separate clock signal to clock the data. Instead, the rate at which data is sent and received must be predetermined or prenegotiated, and independently controlled on both the sending and receiving ends. This data rate is known as the baud rate, which is the inverse of one bit period. The baud rate is generally one of a number of predefined rates, which are standard within the industry. Such rates include 1200, 2400, 4800, 9600, 19.2K, 28.8K, 33.3K, and 54K baud and high data transfer rates.

Due to the prevalence of serial data communication, many microcontrollers include one or more asynchronous serial ports (ASPs) which can transmit and receive data one bit at a time. Such microcontrollers typically employ interrupt signals to notify the microprocessor core that an ASP requires services. An ASP typically issues an interrupt request signal when a data unit has been received by the ASP and needs to be transferred from the ASP to an external memory unit, when the ASP is finished transmitting a data unit and the next data unit to be transmitted must be transferred from the external memory unit to the ASP, or when an error occurs.

An ASP can be configured for a variety data formats, although historically seven or eight data bits are typical values. A number of nine-bit serial protocols, however, have been developed using microcontrollers, including a nine-bit asynchronous serial protocol in conjunction with direct memory access. Such protocols are described in U.S. patent application Ser. No. 08/807,103, now U.S. Pat. No. 5,896,549 entitled A MICROCONTROLLER WHICH IS CONFIGURABLE TO TRANSFER DATA TO AND FROM ONE OR MORE ASYNCHRONOUS SERIAL PORTS USING DIRECT MEMORY ACCESS, filed Feb. 4, 1997, by John P. Hansen and Melanie D. Typaldos, and U.S. patent application Ser. No. 08/775,262, now U.S. Pat. No. 5,978,865 entitled A MICROCONTROLLER HAVING HARDWARE FEATURES SUPPORTING 9-BIT SERIAL PROTOCOLS DURING DMA DATA TRANSFERS TO AND FROM ONE OR MORE ASYNCHRONOUS SERIAL PORTS, filed Feb. 4, 1997, by John P. Hansen, Ronald W. Stents, and Melanie D. Typaldos, both of which are commonly assigned and hereby incorporated by reference. These protocols are also described in the Am186E S Users Manual and Am186ED Users Manual, both by Advanced Micro Devices, Inc. of Sunnyvale, California. As described in those applications, and as discussed below, a separate control bit is set or reset to act as the ninth data bit during transmission and reception of data. To support DMA using such 9-bit protocols, when that particular bit is received as a certain value, an interrupt is caused to indicate that the ninth data bit has in fact been set.

SUMMARY OF THE INVENTION

In a system according to the invention, a microcontroller provides an asynchronous serial port that includes character matching registers. These registers cause an interrupt or an appropriate status bit to be set within an asynchronous serial port when a data item matching the stored character is received. According to the invention, however, this character matching is extended to support address matching. Specifically, an extra address bit match value is provided in a register corresponding to the character matching registers such that if the address bit match value is set and address bits are being employed in the serial protocol, a character does not match in the corresponding character matching register unless the address bit is also set.

In this way, certain of the character matching registers can be set to match data being transmitted over the asynchronous serial port, while other of the character matching registers can be set to match a particular address transmitted during an address frame. This is particularly useful in multidrop systems, where the microcontroller can be programmed to perform an interrupt to the execution unit when a particular address—the address programmed for the particular peripheral device implementing the microcontroller, for example—is received over the asynchronous serial port.

DETAILED DESCRIPTION OF INVENTION RELATED APPLICATION

The following related applications are hereby incorporated by reference:

U.S. patent application Ser. No. 08/920,930, now U.S. Pat. No. 5,958,024 entitled A METHOD AND APPARATUS FOR SUPPORTING HIGH DATA RATES OVER AN ASYNCHRONOUS SERIAL LINE USING DMA, filed Aug. 7, 1997 by Melanie D. Typaldos and Patrick E. Maupin.

U.S. Patent Application, bearing Attorney Docket No. A97323US, entitled COMPRESSION AND DECOMPRESSION OF SERIAL PORT DATA AND STATUS USING DIRECT MEMORY ACCESS, filed concurrently, by David A. Spilo and Melanie D. Typaldos.

Figure 1A:
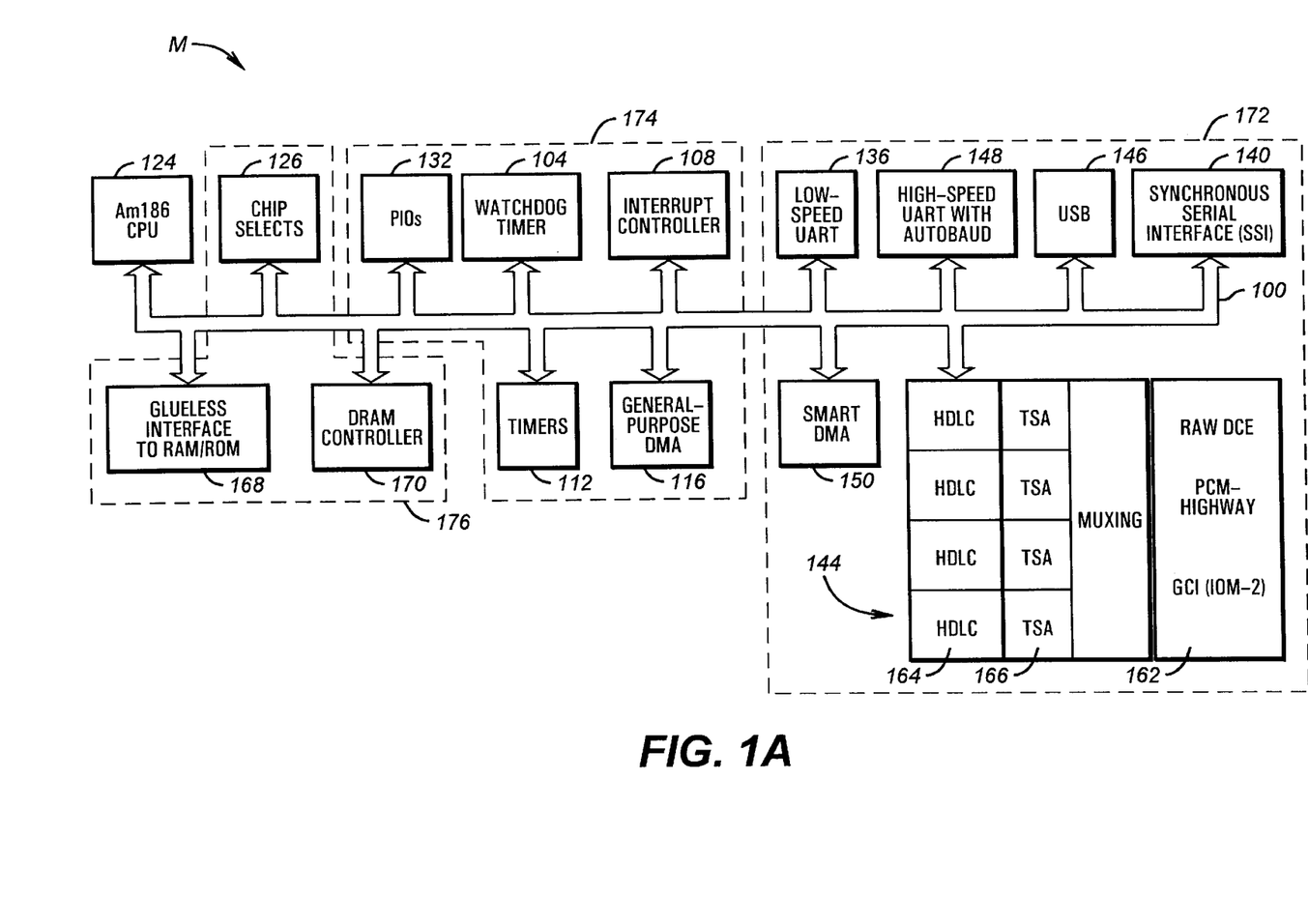
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176 and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "Smart-DMA" unit 150, a unit which provides for chained buffers that are accessed via pairs of DMA channels. The Smart-DMA unit 150 allows for a high degree of packetized transfer without excessive execution unit 124 intervention. The SmartDMA unit 150 preferably consists of four Smart-DMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 1B:
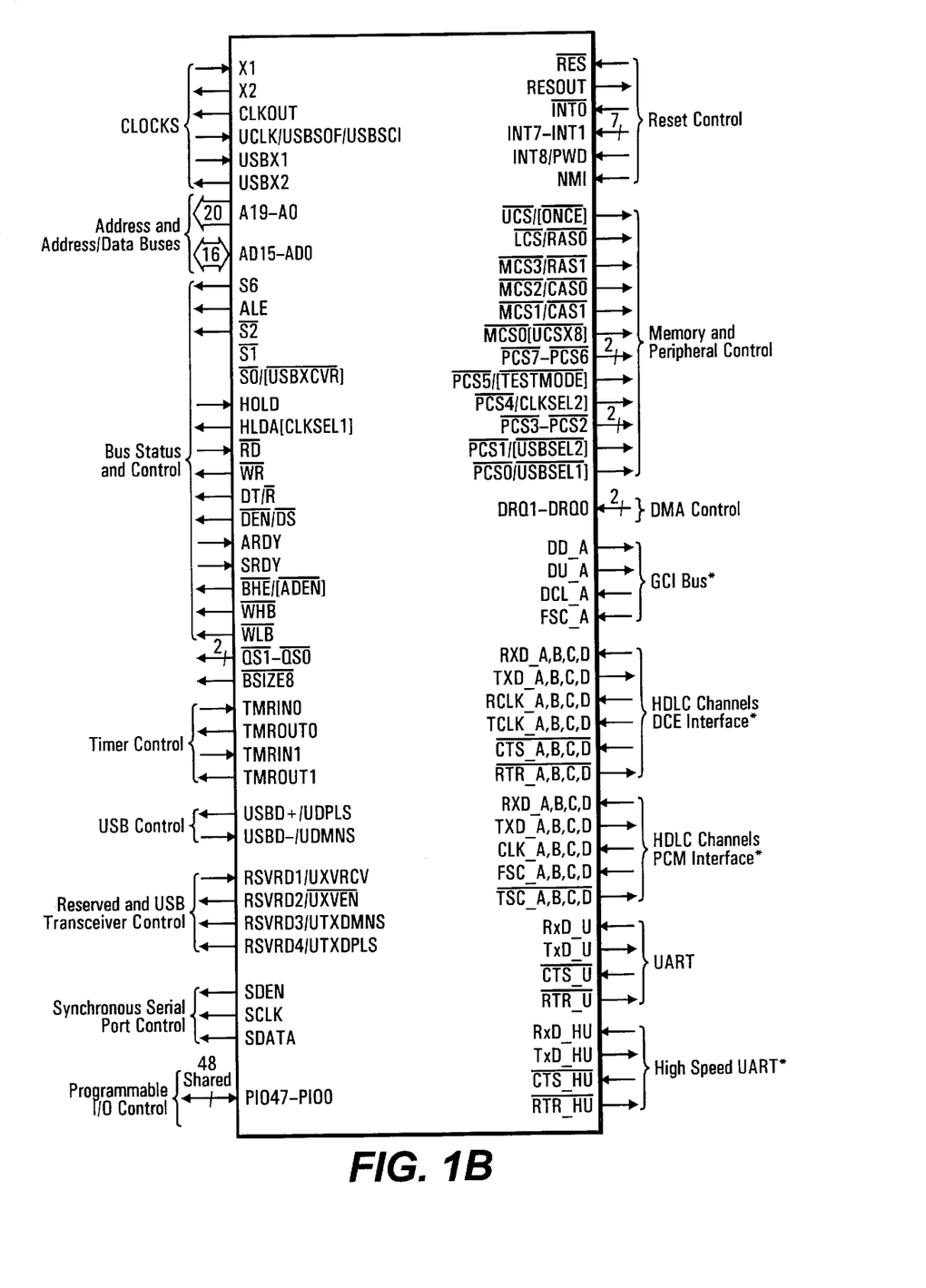
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
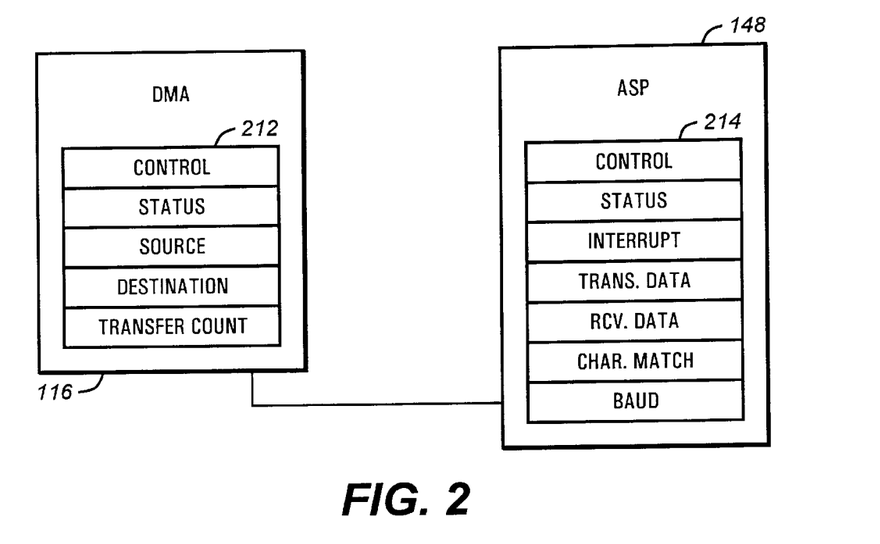
FIG. 2 is a block diagram illustrating the relationship between the asynchronous serial port, the DMA controller, and their registers to the microcontroller of FIGS. 1A and 1B.

Turning to FIG. 2, further illustrated are the DMA unit 116 and the high speed UART 148, here described as an asynchronous serial port (ASP) 148. This is further described in previously incorporated application entitled A METHOD AND APPARATUS FOR SUPPORTING HIGH DATA RATES OVER AN ASYNCHRONOUS SERIAL LINE USING DMA. The ASP 148 can support an asynchronous serial protocol that employs an "address bit" as an extra serial bit.

Figure 3:
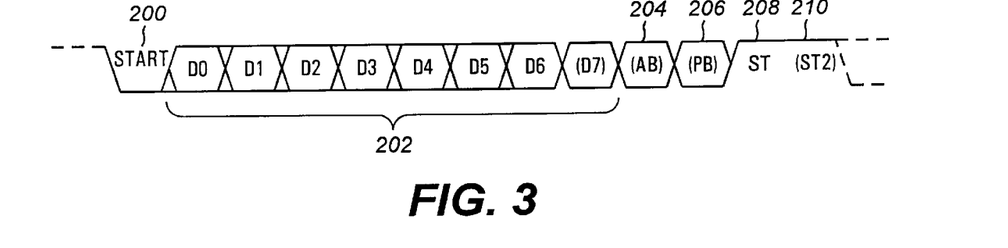
FIG. 3 is a timing diagram illustrating the use of address bits within an asynchronous serial frame according to the invention.

Referring to FIG. 3, illustrated is an asynchronous serial transmission employing such a protocol. After a start bit 200, the ASP 148 transmits or receives 7 or 8 data bits 202. These are standard data bits sent in an asynchronous protocol, low order bit first. After the 7 or 8 data bits 202, however, the address bit protocol supported by the ASP 148 provides for an optional address bit AB 204. This address bit is typically either the 8th or 9th bit transmitted or received by the ASP 148, and is typically used in applications such as multi-drop applications that require one master device to control multiple slave devices. Although called an address bit, this bit can act as an extended bit that effectively causes interrupts within the slave devices for flow and other control. This address bit protocol is known to the art.

After the optional address bit AB 204, an optional parity bit PB 206 is then followed by a stop bit ST 208, and then an optional second stop bit ST 2210.

Returning to FIG. 2, the DMA unit 116 and the ASP 148 have additional features according to the invention that may be useful in sending and receiving data that employs an address bit AD 204 as illustrated in FIG. 3. These features are best understood by examining a set of registers within the DMA unit 116 and the ASP 148, here shown as DMA registers 212 and ASP registers 214. The DMA registers 212 will be further discussed in conjunction with FIGS. 6A–6E, and the ASP registers 214 will be further discussed in conjunction with FIGS. 7A–7G.

BYTE-TO-WORD EXPANSION AND WORD-TO-BYTE COMPRESSION DMA UNIT

In one aspect of the microcontroller M according to the invention, the DMA unit 116 can compress and decompress data during transfers between a source and a destination that have two differing data sizes. For example, the DMA unit 116 can read data byte-by-byte from a source memory block, and write each read byte of data as the low (or high) order byte of consecutive words in a destination memory block. Conversely, the DMA unit can read the low order byte of consecutive words of data from a source block, and then store those read bytes consecutively in a destination block. This is especially helpful in conjunction with the ASP 148 when it is used in an extended read and write mode. As further discussed below in conjunction with FIGS. 7A–7G, and as previously described in the concurrently pending application METHOD AND APPARATUS FOR SUPPORTING HIGH DATA RATES OVER A ASYNCHRONOUS SERIAL LINE USING DMA, the ASP 148 can read in 7 or 8 bit data units over a serial line, but store that data into a 16-bit word along with both an address bit and status bits corresponding to that I/O read. These are further illustrated in FIG. 7G, discussed below, but to summarize, parity errors, overrun errors, framing errors, character matches, breaks, the address bit, and other status can be stored along with 7 or 8 bits of data actually received. When this is performed using DMA, this allows the execution unit 124 to go back and examine the received data to determine where any errors may have occurred or address bits may have been set, and process the data accordingly.

But once errors are examined and address bits are processed, typically the received data no longer needs that associated status. That is, the execution unit 124 can then simply store the data as 7 or 8 bit data within bytes instead of as words.

Figure 4:
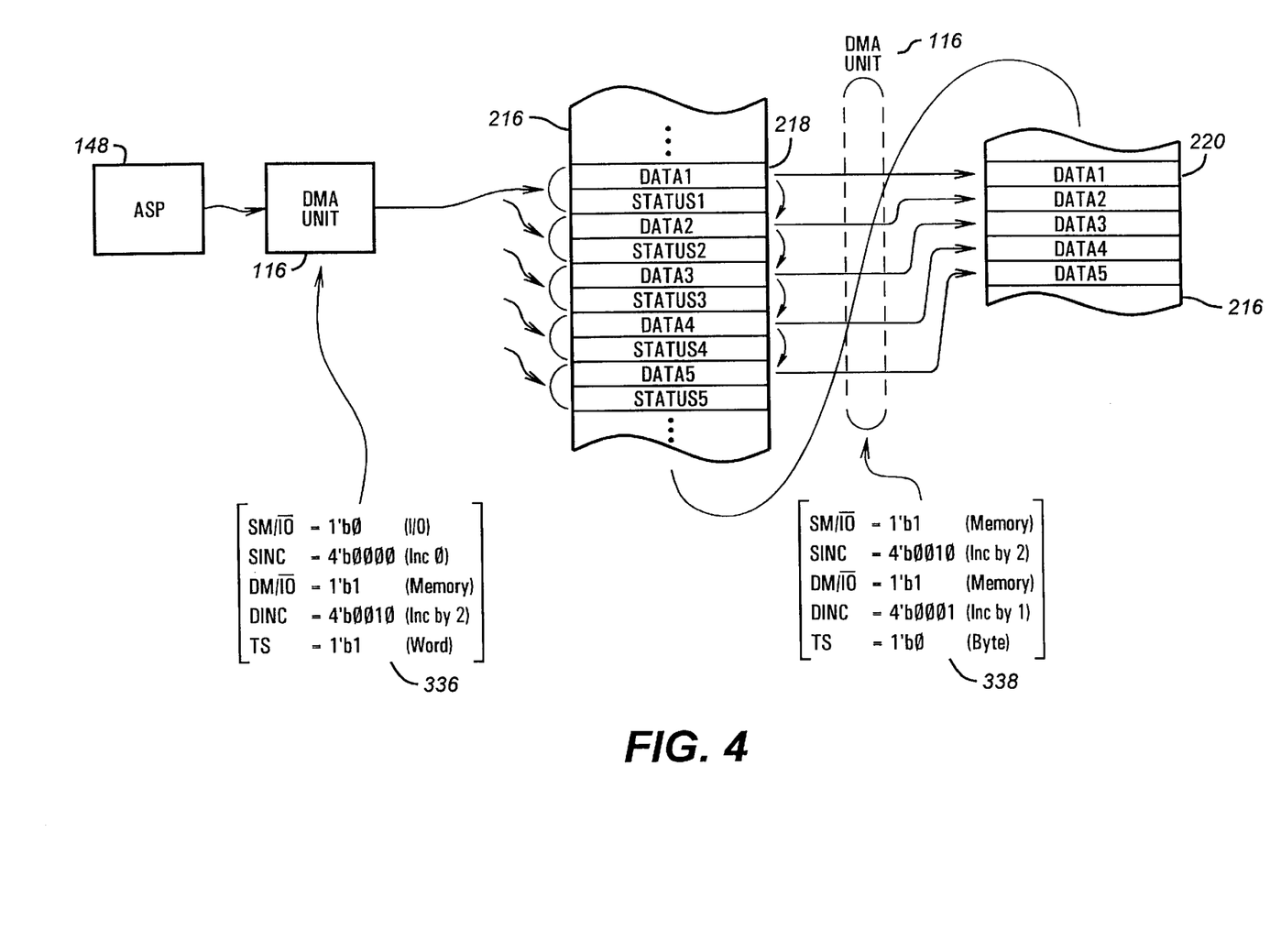
FIG. 4 is a diagram illustrating the DMA unit data compression according to the invention.

It is at this point that the DMA unit 116 is especially advantageous. Referring to FIG. 4, illustrated is the DMA unit 116 processing data from the ASP unit 148 as discussed. The DMA unit 116 stores this data in a memory 216 as a series of data and status bytes within a block 218, shown as DATA1, STATUS1, DATA2, STATUS2, etc. So, each 7 or 8 bit data value DATA1–DATAn occupies 16 bits when combined with its associated status byte STATUS1–STATUSn.

The DMA unit 116, however, can then be programmed by the execution unit 124 to perform a transfer from the block 218 to another block 220 in the memory 216, but this block to include simply a number of the consecutive data values DATA1–DATAn but without the associated status. The DMA unit 116 first reads the first data item DATA1 and from the block 218 then writes it to the destination location DATA1 in the block 220. Then, however, the DMA unit 116 increments the destination address within the block 220 by 1 but simultaneously increments the source address in the block 218 by 2. Therefore, the next data item read from the block 218 is DATA2 (STATUS1 is skipped), which is then written as a byte in the destination block 220 immediately after the first data item DATA1. This is repeated, compressing the data such that the original 16-bit data and status values are now simply 8-bit data values.

Figure 5:
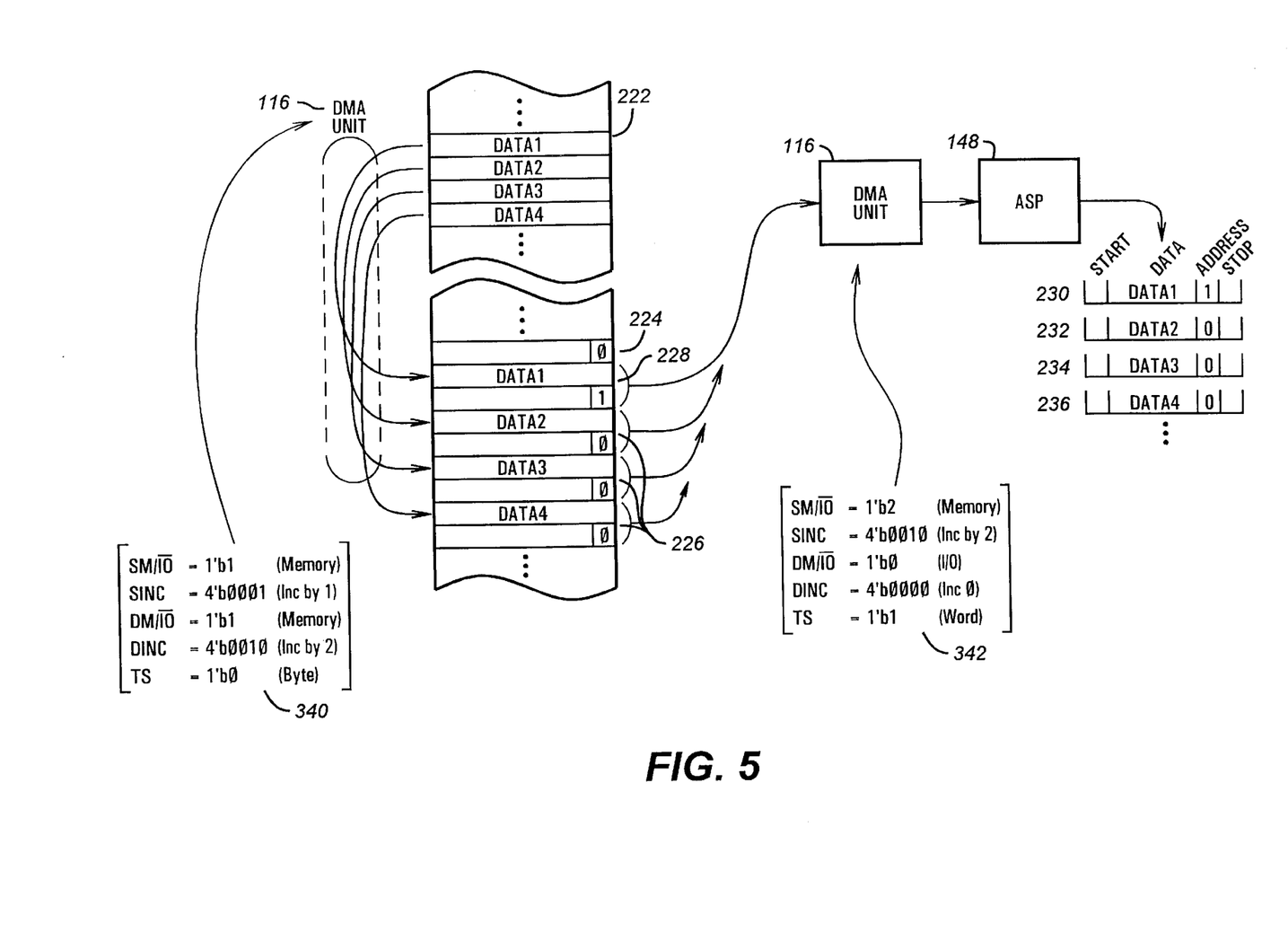
FIG. 5 is a diagram illustrating the DMA unit data expansion according to the invention.

Turning to FIG. 5, the reverse is illustrated for writes by the ASP 148 of external data. Here, a source data block 222 contains data that the microcontroller M should transmit to an external asynchronous serial line. This data includes four data items DATA4 that each occupy 7 or 8 bits within a byte of memory. The DMA unit 116 is programmed to read the first of these data items DATA1 in the block 222, and then write that data item DATA1 into a destination block 224. Then, the source address within the data block 222 is incremented, but the destination address within the destination block 224 is incremented by 2. Thus, the next data item DATA2 is read from the source block 222, but is written 2 bytes later into the destination block 224.

Before that data is actually transmitted, it may be desirable for the execution unit 124 to clear address bits that are stored in the intervening bytes of the data items DATA1–DATA4 in the destination block 224. Here, three address bits 226 are shown cleared, and one address bit 228 set.

The DMA unit 116 is then programmed to perform word-size writes to the ASP 148 using the extended write capability of the ASP 148. The low order bit of the high order byte is then used as the address bit for transmission of data, resulting in four illustrated data items 230, 232, 234, and 236, the first of which has its address bit set and the remainder of which do not.

The DMA unit 116 may include more than one DMA channel, and those DMA channels can be implemented as circular buffers. It would be further possible to implement two channels in FIG. 4 such that one channel was reading extended data from the ASP 148 and then writing it into a circular buffer implemented as the buffer 218, and then a second channel was reading from the buffer 218, compressing the data into the destination buffer 220.

By providing compression and decompression of data by the DMA unit 116, the execution unit 124 is relieved of the processing overhead required to strip or add unneeded status information from or to data before the DMA unit 116 sends or receives data to the ASP 148.

Figure 6A:
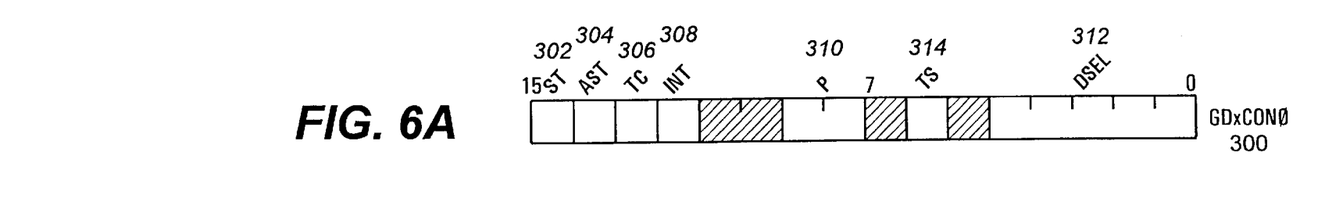
FIGS. 6A–6E are block diagrams illustrating register contents in a DMA unit according to the invention.

Turning to FIGS. 6A–6E, illustrated are five of the DMA registers 212 employed to implement the compression and decompression according to the invention. In FIG. 6A, illustrated is a general purpose DMA channel "x" control register GDxCON0 300. (Note with four channels, the "x" would be from 1 to 4.)

The GDxCON0 register 300 includes a number of standard general purpose DMA control bits, such as a start/stop bit ST 302, an auto start bit AST 304, a terminal count stop bit TC 306, an interrupt enable bit INT 308, a priority field P 310, and a DMA request source field DSEL 312.

The GDxCON0 register 300 also includes a transfer size bit TS 314. This bit selects whether the channel will transfer a byte of data at a time (TS=0, or 1'b0), or will transfer a word at a time, (TS=1'b1). With the compression and decompression functions according to the invention, the TS bit 314 will generally be set to 0 for byte size transfers.

Figure 6B:
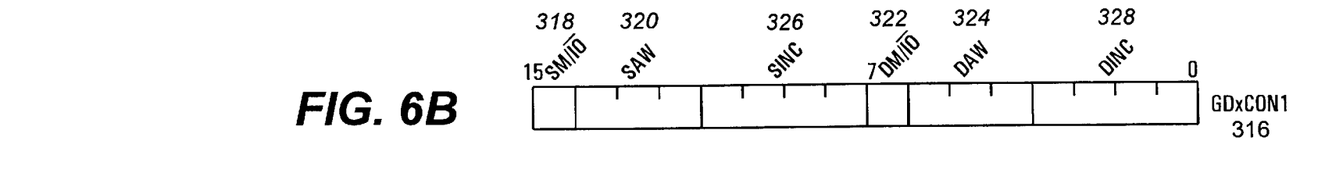

Turning to FIG. 6B, illustrated is a second general purpose DMA control register GDxCON1 316. The GDxCON1 register 316 also includes a number of standard DMA bits, such as a source address space select bit SM/*IO 318, a source address wrap field SAW 320, a destination address space select bit DM/*IO 322, and a destination address wrap field DAW 324. The SM/*IO bit 318 and the DM/*IO bit 322 select whether the source and destination space will be memory or I/O.

When the source or destination address space is to be in memory, generally it is desirable to increment or decrement a source and destination address after the data is sent or received. To this end, two fields are provided, a source increment field SINC 326 and a destination increment field DINC 328. These are 4-bit 2's complements values that are added to the source and destination pointer after each transfer. For example, if the SINC field 326 or the DINC field 328 are 0, there is no increment. If they are equal to a binary 1, or 4'b0001, the fields are incremented by 1. If they equal 4'b0010, the pointers are incremented by 2 bytes, if equal to 4'b0011, incremented by 3 bytes, and so on. For negative values the opposite is true. For example, using 2's complement format, if the SINC or DINC fields 326 or 328 are equal to 4'b1111, the source or destination address will be decremented by 1 after the transfer.

By providing a separate SINC field 326 and DINC field 328, and further by providing that the amount of increment or decrement is independent of the size of the data item, compression or decompression of data using DMA can be affected. This is further discussed below again in conjunction with FIGS. 4 and 5.

Figure 6C:
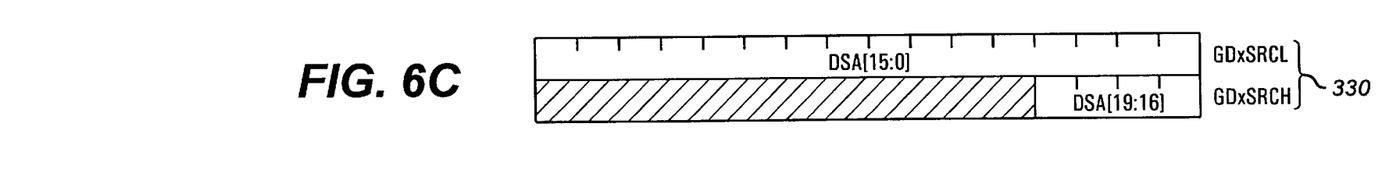
Figure 6D:
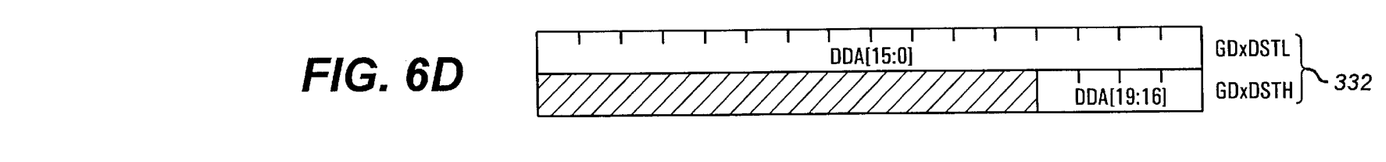
Figure 6E:
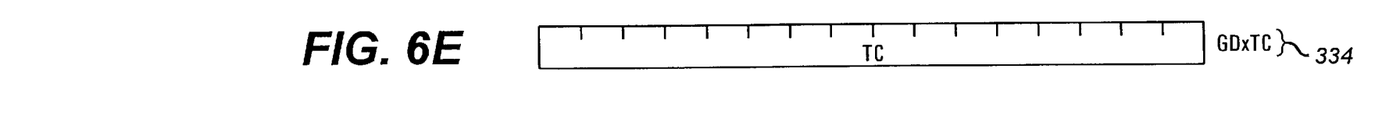

Turning to FIGS. 6C and 6D, illustrated are source address registers 330 and destination address registers 332. Finally, turning to FIG. 6E, illustrated is a transfer count register 334. These are all well understood in conjunction with the DMA design.

Returning to FIGS. 4 and 5, and given the registers described in FIGS. 6A–6E, the programming and operation of the DMA unit 116 for compression is better understood. In FIG. 4, for the transfer between the ASP 148 and the destination block 218, the DMA unit 116 is programmed with a set of values 336. Specifically, the source is set to be from an I/O location, and to increment by 0 after each transfer (appropriate for an I/O location), and the destination is set to memory and is set to increment by 2 after each transfer. Further, the data size is set to a word. This provides that each transfer will be a 16-bit extended serial read value from the ASP 148, which is stored word-by-word in the destination block 218.

For the compression function, the DMA unit 116 is programmed with a set of values 338. Specifically, the source is set in memory (and the source address 330 will be set to the start of the source block 218), and is set to increment by 2 after each transfer. The destination is also set in memory, but the destination address is incremented by only 1 after each transfer. Finally, the transfer size is set for 1 byte. This means that 1 byte will be read from the source block 218 and written to the destination block 220 as DATA1. The source address 330, however, will then be incremented by 2, while the destination address 332 will only be incremented by 1. Then a second byte of data, DATA2, will be read from the source block 218 and written immediately after DATA1 in the destination block 220. Thus, unneeded status information in STATUS1 is skipped.

Of note, the destination block 220 could be programmed to actually overlap with the source block 218 because after the data is read from the source block 218, it is no longer needed. Thus, the source buffer can literally be used as the destination buffer, saving memory space.

Turning to FIG. 5, the expansion capability of the DMA unit 116 is illustrated by a set of programmed values 340. Here, the source block 222 of 8-bit data is expanded by setting the DMA unit 116 to transfer from memory to memory, by setting the SINC field 326 to a value of 1, but setting the DINC field 328 to a value of 2. The transfer size bit TS 314 is set to 0, such that data is transferred a byte at a time. With this programming, a data byte is read from the source block 222 and written to the destination block 224, but the next data byte consecutively read from the source block 222 is written 2 bytes later in the destination block 224. The execution unit 124 can then appropriately set or reset the address bits AB, in the destination block 224, and institute a second DMA transfer to the ASP 148.

Here, a set of programmed values 342 is used, which provide for a source in memory and destination in I/O space, and provide for a source increment SINC 326 value of 2 and no destination increment. Further, the transfer size bit TS 314 is set to 1 for word transfers. This results in the extended data being written to the ASP 148, so that it can control the 9th, address bit on its transmission of serial data.

Therefore, by providing independent controllability of the source increment and destination increment independent of the size of the data being transferred, compression and decompression of memory can be affected. This could be used for a variety of other functions in which it was desirable to compress word data into byte data, or vice versa.

CHARACTER MATCHING USING ADDRESS BITS

Figure 7A:
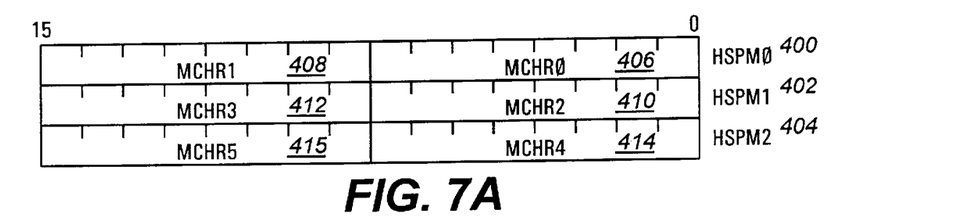
FIGS. 7A–7G are block diagrams illustrating the register contents in the asynchronous serial port according to the invention.

Turning to FIGS. 7A–7G, illustrated are certain of the ASP registers 214 that implement another feature according to the invention. FIG. 7A illustrates 6 character match bytes employed by the ASP 148 for matching characters of received data. Specifically, three registers HSPM0 400, HSPM1 402, and HSPM2 404 contain 6 character match values MCHR0 406 through MCHR5 415.

Figure 7B:
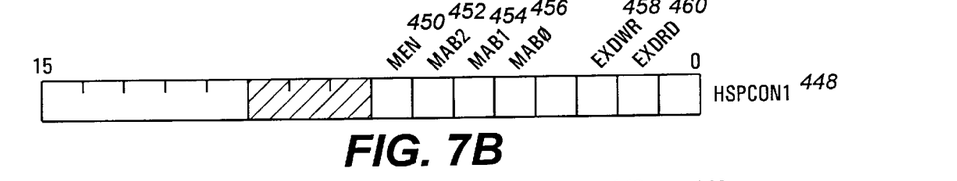
Figure 7C:
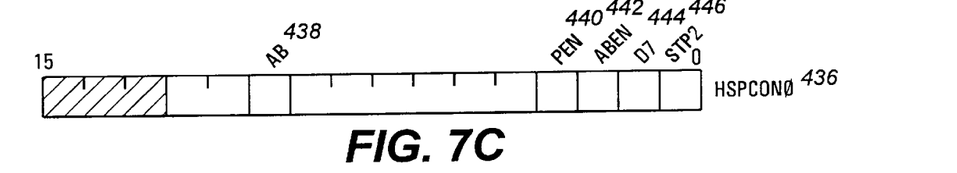
Figure 7D:
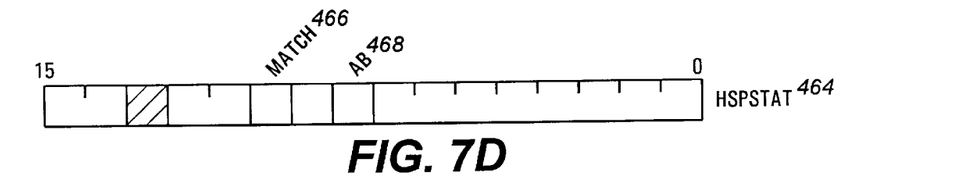
Figure 7E:
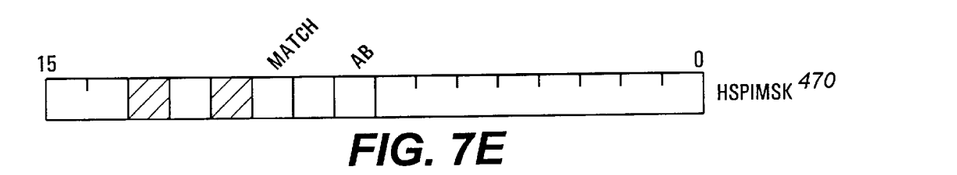
Figure 7F:
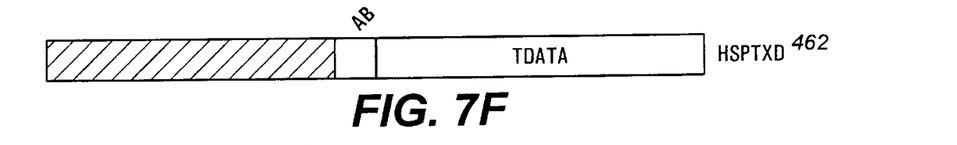
Figure 7G:
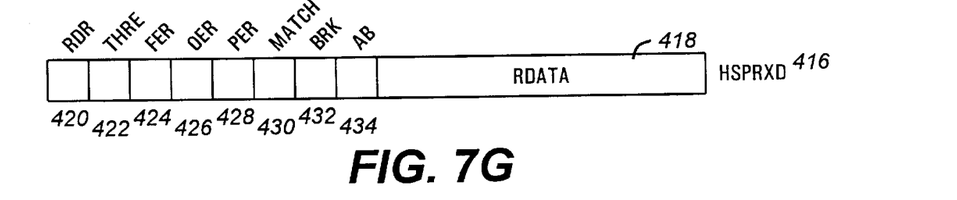

The operation of these byte size values MCHR0 406 through MCHR5 415 is better understood in conjunction with FIG. 7G, which illustrates an asynchronous serial port 418 receive register HSPRXD 416. This register contains a 7 or 8 bit value received data RDATA 418, but also contains 8 status bits 420 through 434.

Historically, only the received data RDATA 418 was compared to the match character values MCHR0 406 through MCHR5 415. When the RDATA value 418 matched one of those matched character values, a status bit was set in a status register, illustrated below in conjunction with FIG. 7D, and an interrupt was generated if an appropriate mask value was set, illustrated below in conjunction with FIG. 7E. Historically, the address bit AB 204, would be reflected as first a bit within the extended data of the HSPRXD register 416 (here the address bit value AB 434), and could also be found in the status register discussed below in conjunction with FIG. 7D. The address bit would not, however, be used to match with one of the character matched values MCHR0 406 through MCHR5 415.

According to the invention, additional bits are provided such that when set, the address bit value AB 434 is matched in addition to the RDATA value RDATA 418.

This is better understood in conjunction with a high speed serial port control register HP CON0 436, illustrated in FIG. 7C. This register in part provides configuration settings to determine whether an address bit is going to be employed (indicated by an ABEN bit 442), whether the parity bits PB 206 will be used (indicated by a parity enable bit PEN 440), whether 7 or 8 bit data will be used and thus whether the D7 bit of the bits 202 will be used (indicated by enable bit D7 444), and whether the second stop bit ST2 210 will be used (indicated by a second stop bit enable bit STP2 446). When data writes, an address bit set or reset bit AB 438 sets or resets the transmitted address bit, as long address bit communication is enabled (controlled by the ABEN bit 442).

All of these bits 438 through 446 affect the length of a transmitted frame. In the disclosed embodiment, and historically, however, even if the receive data 418 is 7-bit data (the D7 bit 444 false) and an address bit is enabled (the ABEN bit 442 is true), the RDATA 418 would not include the address bit. Instead, that would still be stored in the high order byte of the HSPRXD register 416 as the address bit AB 434. Thus, that bit would never be matched with any of the match characters MCHR0 406 through MCHR5 415.

According to the invention, however, additional match character address bit MATCH bits are provided in a second control register HSPCON1 448. Specifically, this register 448 includes a match enable bit MEN 450, which when true, enables the character matching of the MCHR0 406 through MCHR5 415. According to the invention, however, additional character matching bits are provided. Three match address bits MAB2 452, MAB1 454, and MAB0 456 effectively become an address bit matching bit for the three match registers HSPM0 400 through HSPM2 404 when the address bit is enabled by the ABEN bit 442 of the control register HSPCON0 436.

For example, when the MAB2 bit 452 is 0 and the ABEN bit 442 is 1, a received character must have its address bit AB 204 clear to match characters in the HSPM2 register 404. When the MAB2 bit 452 is set, and the ABEN bit 442 is true, a received character must have its address bit AB 204 set in order to match characters in the HSPM2 register 404. The MAB1 bit 454 and the MAB0 bit 456 similarly correspond to the HSPM1 register 402 and the HSPM0 register 400.

Thus, these additional bits in the HSPCON1 register 448 provide for address matching for corresponding ones of the HSPM0 register 400 through HSPM2 register 404. The ASP 148 could be set up where one of the registers HSPM0 400 through HSPM2 404 was set for character matching, while the other two were set for address matching.

The HSPCON1 register 448 further includes an extended write bit 458 and an extended read bit 460, which provide, when true, that 16-bit data will be read from a transmit register HSPTXD 462 (see FIG. 7F) or received in the receive register HSPRXD 416 (see FIG. 7G). When these values are disabled, only 8-bit data is stored in those registers, and the address bit and the match status can only be determined by reading a status register HPSTAT 464 (see FIG. 7D). That status register 464, among other things, includes a match bit MATCH 466 which is set true if the incoming data is a character or address match (as appropriate) to one of the HSPM0-HSPM2 registers 400–402 and an address bit AB 468 which is set true if the incoming data has its address bit set. An interrupt mask register HSPIMSK 470 correspondingly passes on the match bit MATCH 466 and the address AB 468 as interrupts.

Figure 8:
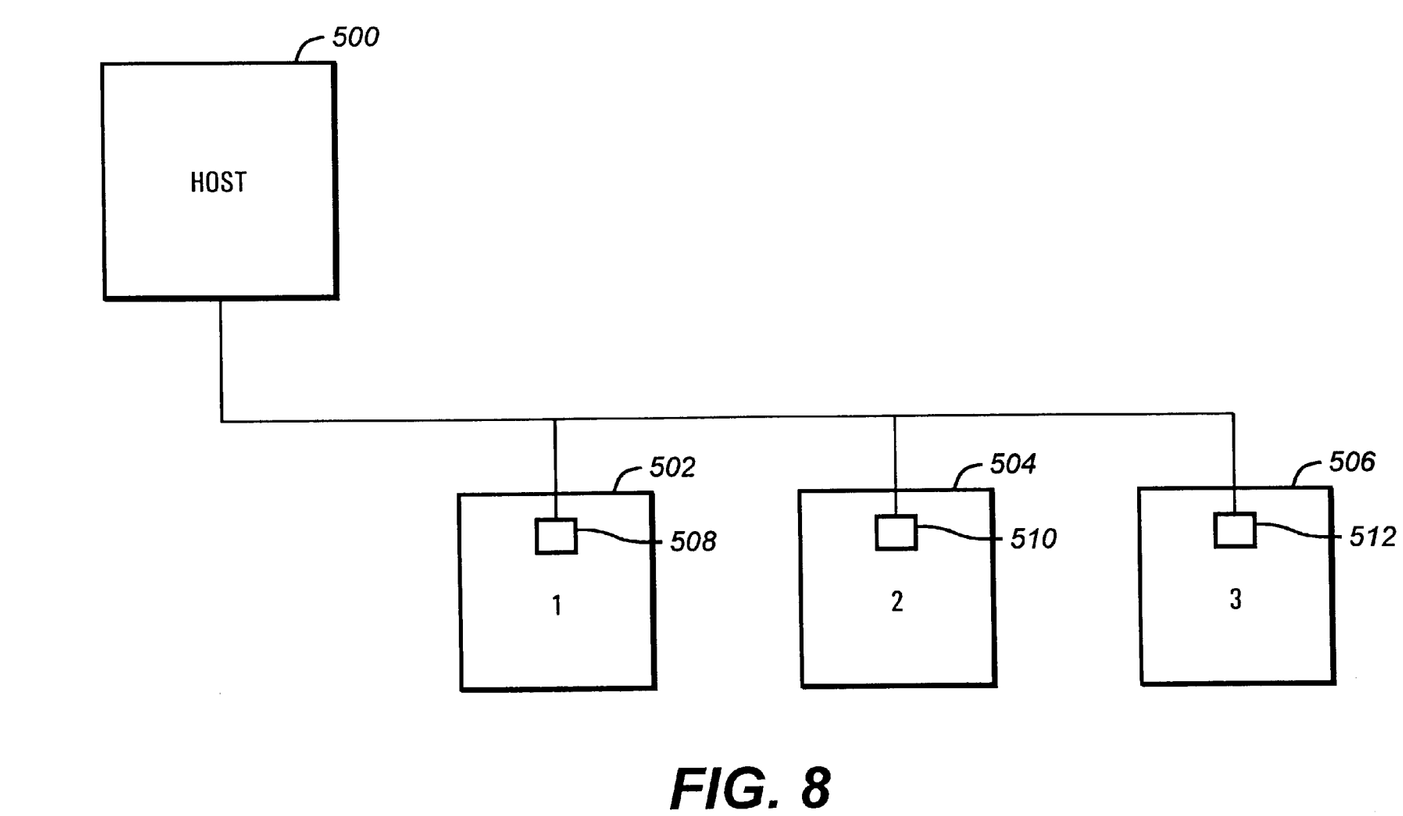
FIG. 8 is a block diagram illustrating the implementation of multidrop asynchronous protocol.

Turning to FIG. 8, illustrated is a multidrop system in which the address bit matching according to the invention could be used. A host system 500 transmits serial data to multiple multidrop peripherals 502, 504, and 506. Each of these peripherals includes a microcontroller M of its own 508, 510, and 512. Each of these can be programmed such that it had a unique address 1, 2, and 3 for the peripherals 502, 504, and 506. Each can be placed into an idle mode where received characters are effectively dumped by each of the peripherals 502, 504, and 506 until one of the peripherals has an address match. For example, the microcontroller 508 of the peripheral 502 could be programmed such that the MCHR0 byte 406 contained the appropriate addressing information, including the "1" address assigned to the peripheral 502, and its associated address matching bit MAB0 456 would be set, along with the address bit enable ABEN 442. In this way, when the host 500 sent a frame of asynchronous data with the appropriate address matching MCHR0 406 to the peripheral 502, that data would match the character in MCHR0 406 and the address bit being set would match the MAB0 456 bit. Therefore, the match bit MATCH 466 would be set in the HPSTAT register 464, and, assuming the match interrupt was set to pass in the HSPIMSK register 470, an interrupt would be passed to the execution unit 124 so that the peripheral 502 could be awaken and set to process subsequent data.

Thus, providing both character matching and address matching independently for certain of the match address registers, the asynchronous serial port according to the invention could not only detect the start and end of data frames based on matchable character data, but can also detect when a particular microcontroller is being addressed in a multidrop system by also matching the address bit. This provides for added flexibility in applications of the microcontroller M.

While techniques according to the invention have been described in conjunction with asynchronous communication ports, they can similarly be used with synchronous communication ports for compression and decompression and for address matching.

The foregoing disclosure and description of the invention are illustrative and explanatory thereof, and various changes in the details of the illustrated apparatus and construction and method of operation may be made without departing from the spirit of the invention.

What is claimed is:

1. A microcontroller comprising:

an execution unit for executing instructions; and an asynchronous serial port supporting address bits, comprising:

a plurality of character matching registers that upon the asynchronous serial port receiving asynchronous data that matches one of the plurality of character matching registers, causes a character match to be indicated; and a plurality of address match bits associated with the plurality of character matching registers, such that a character match indication can be further conditioned by the match of an address bit on received data.

2. The microcontroller of claim 1, wherein the address match bits are held in a different register than the character match registers.

3. The microcontroller of claim 1, wherein the UART is a high speed UART.

4. The microcontroller of claim 1, wherein the transmission and reception of address bits is enabled by an address bit enable bit in a control register.

5. The microcontroller of claim 1, wherein the character matching and address bit matching is configurable for matching 8 bits of character data plus an address bit.

6. The microcontroller of claim 1, wherein the character matching and address bit matching is configurable for matching 7 bits of character data plus an address bit.

7. The microcontroller of claim 1, wherein an interrupt is generated upon a character match.

8. An asynchronous serial port supporting address bits, comprising:

a plurality of character matching registers that upon the asynchronous serial port receiving asynchronous data that matches one of the plurality of character matching registers, causes a character match to be indicated; and a plurality of address match bits associated with the plurality of character matching registers, such that a character match indication can be further conditioned by the match of an address bit on received data.

9. The microcontroller of claim 8, wherein the address match bits are held in a different register than the character match registers.

10. The asynchronous serial port of claim 8, wherein the UART is a high speed UART.

11. The asynchronous serial port of claim 8, wherein the transmission and reception of address bits is enabled by an address bit enable bit in a control register.

12. The asynchronous serial port of claim 8, wherein the character matching and address bit matching is configurable for matching 8 bits of character data plus an address bit.

13. The asynchronous serial port of claim 8, wherein the character matching and address bit matching is configurable for matching 7 bits of character data plus an address bit.

14. The asynchronous serial port of claim 8, wherein an interrupt is generated upon a character match.

15. A method of address matching in a multidrop asynchronous serial configuration, comprising:

providing a peripheral on a multidrop asynchronous serial line;

programming the address of a peripheral on the asynchronous serial line into a character match register;

enabling address bit matching for the character match register; and when a frame of data is received that matches the character data and the character match register and the address bit is set, determining that the peripheral is being addressed.

\* \* \* \* \*